(12) United States Patent
Drewery et al.

(10) Patent No.: US 7,695,597 B1
(45) Date of Patent: Apr. 13, 2010

(54) CONDUCTIVE PLANARIZATION ASSEMBLY FOR ELECTROCHEMICAL MECHANICAL PLANARIZATION OF A WORK PIECE

(75) Inventors: John Drewery, Santa Clara, CA (US); Francisco Juarez, Fremont, CA (US); Henner Meinhold, Fremont, CA (US)

(73) Assignee: Novellus Systems, Inc., San Jose, CA (US)

( * ) Notice: Subject to any disclaimer, the term of this patent is extended or adjusted under 35 U.S.C. 154(b) by 673 days.

(21) Appl. No.: 11/393,581

(22) Filed: Mar. 29, 2006

(51) Int. Cl.
*C25B 9/00* (2006.01)
*C25D 17/00* (2006.01)

(52) U.S. Cl. .................... 204/242; 204/193; 204/194
(58) Field of Classification Search ............. 204/242, 204/193, 194
See application file for complete search history.

(56) References Cited

U.S. PATENT DOCUMENTS

| | | | |
|---|---|---|---|
| 6,482,307 B2 | 11/2002 | Ashjaee et al. | |
| 6,736,952 B2 | 5/2004 | Emesh et al. | |
| 2002/0119286 A1* | 8/2002 | Chen et al. | 428/131 |
| 2005/0016681 A1* | 1/2005 | Emesh et al. | 156/345.12 |
| 2007/0034525 A1* | 2/2007 | Kumekawa et al. | 205/640 |
| 2007/0153453 A1* | 7/2007 | Wang et al. | 361/679 |

* cited by examiner

*Primary Examiner*—Harry Wilkins
*Assistant Examiner*—Zulmariam Mendez
(74) *Attorney, Agent, or Firm*—Ingrassia Fisher & Lorenz, P.C.

(57) ABSTRACT

A conductive planarization assembly for use in electrochemical mechanical planarization is provided. A conductive planarization assembly in accordance with an exemplary embodiment of the invention comprises a first insulating member and a second insulating member overlying the first insulating member and having a plurality of first holes. A conductive member is interposed between the first insulating member and the second insulating member and is electrically coupled to an external circuit. The conductive member comprises a plurality of cathode regions that are exposed by the plurality of first holes of the second insulating member.

21 Claims, 4 Drawing Sheets

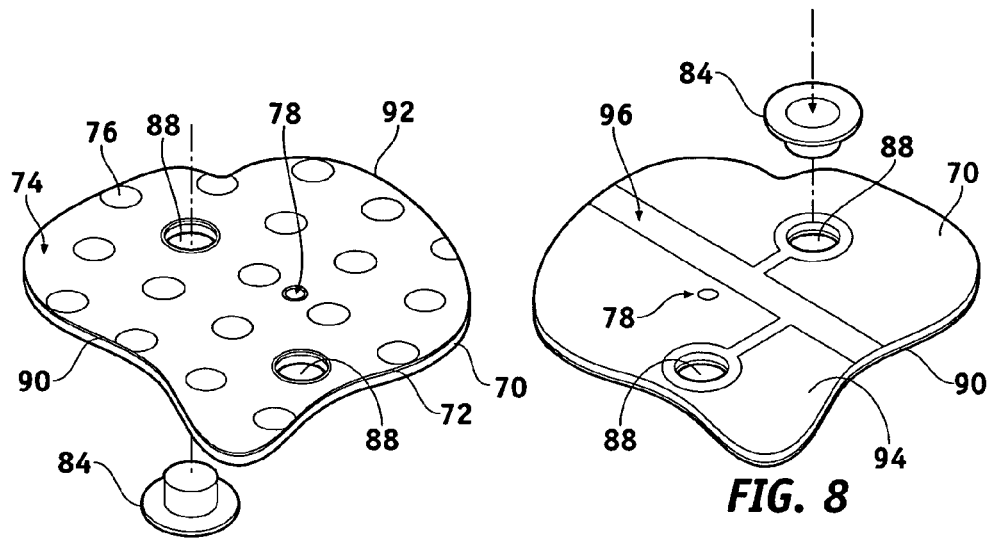
FIG. 7
FIG. 8
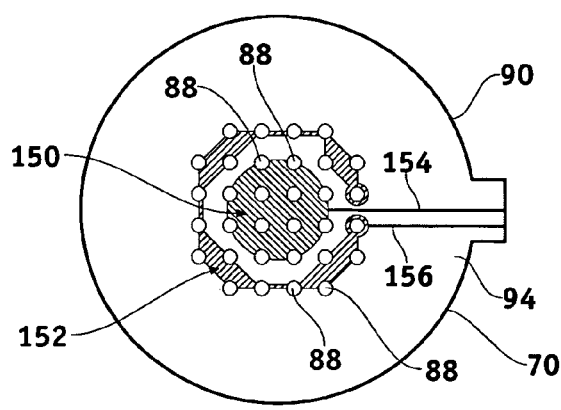
FIG. 9
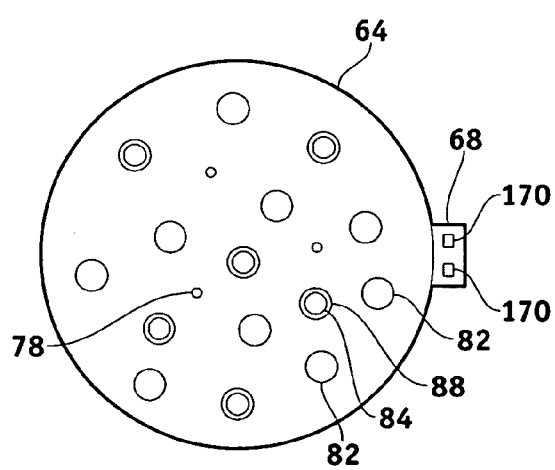
FIG. 10

CONDUCTIVE PLANARIZATION ASSEMBLY FOR ELECTROCHEMICAL MECHANICAL PLANARIZATION OF A WORK PIECE

FIELD OF THE INVENTION

The present invention generally relates to systems for polishing or planarizing work pieces, such as semiconductor wafers, and more particularly relates to a conductive planarization assembly for use in an electrochemical mechanical planarization system.

BACKGROUND OF THE INVENTION

Chemical mechanical polishing (CMP) is a technique that has been conventionally used for planarization of semiconductor wafers. It is often used in the formation of microelectronic devices to provide a substantially smooth, planar surface suitable for subsequent fabrication processes such as photoresist coating and pattern definition. A typical CMP apparatus 10 suitable for planarizing a semiconductor surface is illustrated in FIG. 1 and includes a wafer carrier 12 configured to support, guide, and apply pressure to a wafer 14 during the polishing process. The carrier 12 may be raised and lowered to load a wafer, and may be rotated about a first axis 16. The carrier may comprise a pressure control system 24 that applies a substantially constant pressure distributed across the back of the wafer 14. The pressure control system may take any suitable form, such as, for example, that of an inflated bladder formed from an elastomeric material. A retaining ring 18 may be provided to prevent the wafer 14 from being dragged out from between the carrier 12 and a polishing pad 20 by polishing forces. The polishing pad 20 is supported by a rigid platen 22 that may rotate about a second axis 26 or, alternatively, may move in an orbital, linear or other motion. The polishing pad typically comprises a polymeric material with a predetermined elastic modulus and surface structure that simultaneously provide effective polishing of the wafer and compliance with the wafer over lateral features that may differ in height on the order of several centimeters. Motion is imparted to the wafer carrier 12 and to the polishing pad 20 so that the wafer is rubbed against the pad. A liquid slurry 28 may be injected onto the pad via a nozzle 30 or may be distributed to the polishing pad surface through the polishing pad to chemically weaken the molecular bonds at the wafer surface so that the mechanical action of the polishing pad and slurry can remove the undesired material from the wafer surface.

However, conventional CMP processes tend to leave stresses in the worked wafer leading to subsequent cracking and shorting between metal layers of the wafer. Furthermore, conventional CMP processes may result in sheering or crushing of fragile dielectric layers. These processes also have a tendency to cause dishing in the center of wide metal features, such as trenches and vias, oxide erosion between metal features, and dielectric oxide loss. Electrochemical mechanical planarization (ECMP) is an attractive alternative to removal of metal by CMP because it does not impart significant mechanical stresses to the wafer, and consequently does not significantly reduce the integrity of the devices. In addition, because the removal rate of the metal may be completely controlled by a current flowing through the metal, ECMP is less likely to cause dishing, oxide erosion, and oxide loss of the dielectric layer.

In ECMP, metal removal is accomplished by electrolysis rather than by the corrosive action of a slurry. A conventional ECMP system, illustrated in FIG. 2, is similar to a CMP system in that it comprises a wafer carrier 12 that carries a wafer 14 and comprises a polishing pad 20 that is supported by a rigid platen 22. Electric contacts 42 (anodes) may be disposed within the platen 22 and extend through the polishing pad 20 to make contact with the surface of the wafer 14. To complete the ECMP system 40, the wafer is exposed to an electric field in the presence of an electrolyte 48. In this regard, counterelectrodes 44 are provided. Varying voltages may be imposed between the wafer and the counterelectrodes by a power supply 46. The counterelectrodes 44 allow for a degree of "tuning" of the uniformity of removal of the metal by passing varying current through the individual electrodes. The pad typically comprises holes to allow ion transport from the wafer 14 to the counterelectrodes 44 or, alternatively, the pad is sufficiently porous that this ion transfer may occur. The electrolyte 48 may be dispensed onto the polishing pad or may be distributed through the polishing pad to the wafer surface.

However, conventional ECMP systems have certain drawbacks. With the use of conventional high resistivity electrolytes, a region of a wafer with a high density of metal will experience a larger current density (averaged over a region of lateral dimension of hundreds of microns) than a region of the wafer with a lower density of metal. This variation in current density leads to variations in the voltage distribution in the electrolyte and to a redistribution of the electric field. This leads to a higher removal rate over regions of high metal density than over regions of smaller metal density. This effect can be minimized by reducing the spacing between the wafer and the counterelectrode. However, in typical ECMP systems, the counterelectrode generally is no closer to the wafer than the thickness of the polishing pad.

In addition, during an ECMP process, the metal removed from the wafer may be deposited on the counterelectrodes. This deposited metal may change the spacing between the wafer and the counterelectrode and may be a source of unwanted particulates due to poor adhesion of the metal deposit. While it may be desirable to fabricate the counterelectrode from a noble metal such as platinum, palladium, or gold, these materials are costly and thus fabricating solid counterelectrodes from such metals is impractical. Platinum group metals also tend to absorb hydrogen when used as cathodes, which may result in long term drifts in the behavior of such electrodes. In addition, wear of the cathodes during ECMP processes requires replacement of the cathodes at periodic intervals.

Accordingly, it is desirable to provide a conductive polishing assembly for use in ECMP processing that overcomes these drawbacks. In addition, it is desirable to provide a conductive polishing assembly that provides controlled planarization of the wafer surface. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein

FIG. 7 is a schematic illustration of a first face of conductive member of the conductive polishing apparatus of FIG. 6, in accordance with an exemplary embodiment of the present invention;

FIG. 8 is a schematic illustration of a second face of the conductive member of FIG. 7;

FIG. 9 is a bottom view of a conductive member of a conductive polishing apparatus, in accordance with an exemplary embodiment of the present invention; and FIG. 10 is a top view of a conductive polishing apparatus, in accordance with an exemplary embodiment of the present invention.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
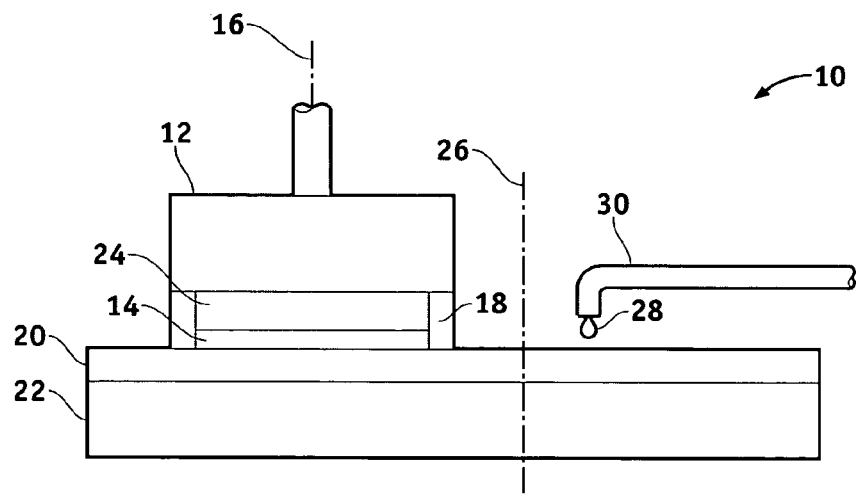
FIG. 1 is a cross-sectional view of a conventional CMP apparatus.
Figure 2:
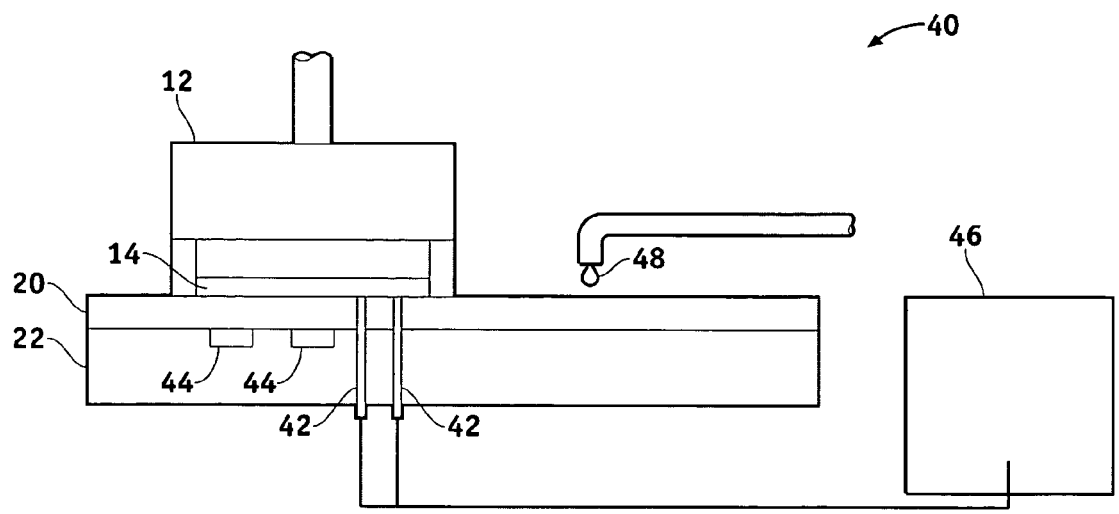
FIG. 2 is a cross-sectional view of a conventional ECMP apparatus.
Figure 3:
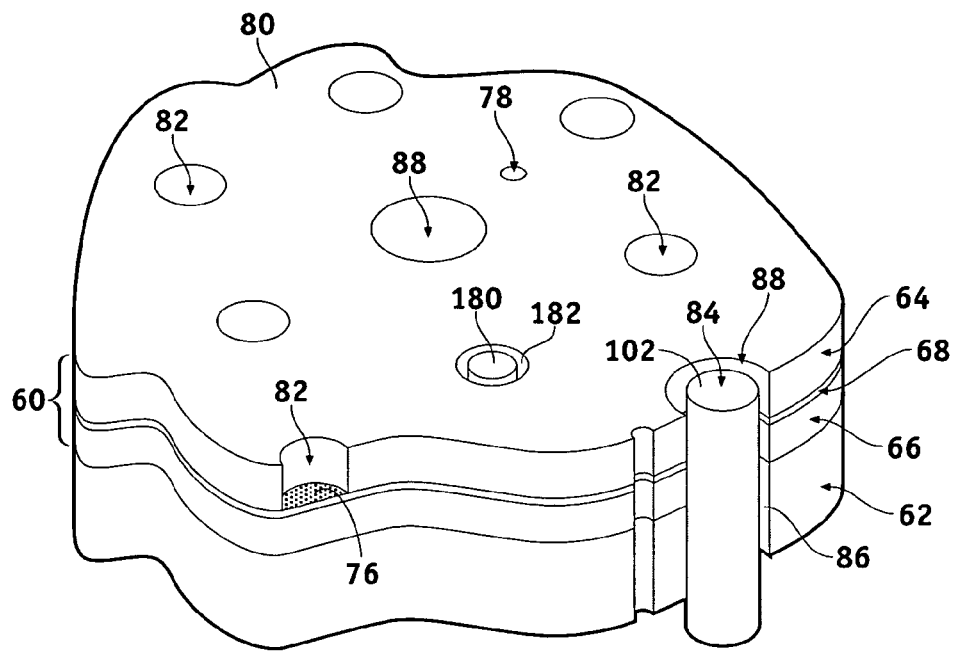
FIG. 3 is a schematic illustration of a conductive polishing apparatus in accordance with an exemplary embodiment of the present invention.

FIG. 3 illustrates a conductive polishing assembly 60 of an ECMP system, in accordance with an exemplary embodiment of the present invention. Conductive polishing assembly 60 is configured to be securely affixed upon a platen 62 of an ECMP apparatus. Conductive polishing assembly 60 comprises a polishing member 64, backing member 66, and a conductive member 68 that is interposed between polishing member 64 and backing member 66. Polishing member 64, conductive member 68, and backing member 66 may be secured together using any suitable fixation method, such as, for example, a pressure sensitive adhesive. Polishing member 64 is suitably formed of an insulating material such as a polymeric material, a polymeric/inorganic composite material, or a ceramic insulation material. The hardness and density of the polishing member 64 may be selected based on the type of metal to be polished or removed. Polyurethane polishing pads are available from Rodel Inc. of Phoenix, Ariz. and may be advantageously used to polish a wafer, although it should be appreciated that any suitable polishing member could be used. In one exemplary embodiment of the invention, polishing member 64 has a thickness of about 20 to 200 microns, preferably about 30 to 80 microns. Backing member 66 also is suitably formed of an insulative material. Backing member 66 may be formed of the same material from which polishing member 64 is formed or may be formed of a different material that has the same or different flexible properties. It will be appreciated by those in the art that the materials selected for polishing member 64 and backing member 66 may be selected based on the compliance properties of conductive polishing assembly 60 that are desired. Preferably, conductive member 68 is less flexible than polishing member 64 and backing member 66 to provide suitable compliance properties for low downforce planarization.

Figure 4:
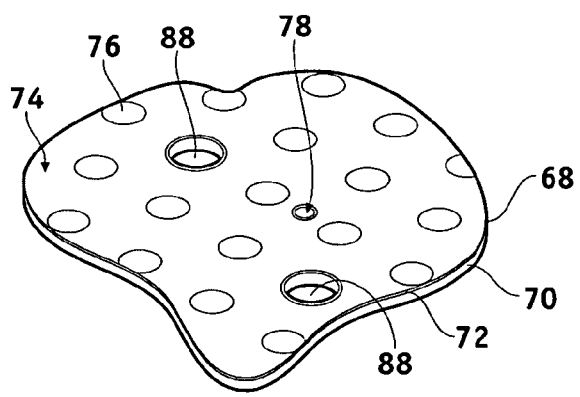
FIG. 4 is a schematic illustration of a conductive member of the conductive polishing apparatus of FIG. 3, in accordance with an exemplary embodiment of the present invention.

Referring momentarily to FIG. 4, conductive member 68 is a thin, flexible layer of conductive material or, alternatively, a thin, flexible layer 70 of non-conductive material upon which is disposed a conductive layer 72 of material. For example, conductive member 68 may comprise a layer of metal, such as copper or aluminum, or may comprise a non-conductive material, such as KAPTON® polyimide film, MYLAR® polyester film, both from DuPont of Circleville, Ohio, or the like, upon which is disposed a metal layer. Conductive layer 72 has a sheet resistance that is sufficiently low to minimize voltage drops between the edge of conductive layer 72 and any given point on conductive layer 72. In an exemplary embodiment of the invention, conductive layer 72 is comprised of a noble metal, such as platinum, palladium, gold, and the like and forms the cathode electrode of the ECMP system. In another exemplary embodiment, conductive layer 72 comprises a first conductive sub-layer 74 having a thickness of about 5 to 500 microns, preferably about 10 to 200 microns, and an overlying second conductive sub-layer 76 that is substantially inert to the electrochemical environment during an ECMP process. For example, the first conductive sub-layer 74 may comprise copper, aluminum, alloys thereof, or the like, and the second conductive sub-layer 76 may comprise a noble metal, such as platinum, palladium, gold, and the like. The second conductive sub-layer 76 may comprise a continuous layer overlying first conductive sub-layer 74, or, in a more preferred embodiment of the invention, the second conductive sub-layer 76 may comprise a plurality of discrete cathode regions 76, such as illustrated in FIG. 4. In this regard, the amount of the noble metal, which tends to be a more expensive material, can be minimized, while a less expensive conductive material, such as copper or aluminum, can be used to electrically couple the cathode regions 76 to an exterior circuit (not shown). Preferably, the first conductive sub-layer is configured as a network of open holes, such as a mesh, a web, or the like, that maintains or does not substantially compromise the flexibility of non-conductive material 70. As described in more detail below, conductive member 68 further comprises holes 88 through which a conductive contact may extend.

Turning back to FIG. 3, conductive polishing apparatus 60 may comprise one or more first holes 78 that may be in fluid contact with a manifold apparatus (not shown) for the delivery of an electrolyte to the surface 80 of polishing member 64. First holes 78 may be coaxial with conduits (not shown) in platen 62 that are in fluid communication with the manifold apparatus. Conductive polishing apparatus 60 further comprises one or more second holes 82 that expose the cathode region(s) 76. In this manner, the cathode regions 76 disposed on conductive member 68 are closer to the wafer during an ECMP process than if the cathode regions were disposed on or in platen 62, as is typical in conventional ECMP systems. Accordingly, a more uniform removal rate of the metal on the wafer may be achieved. In addition, because only the cathode regions 76 are exposed and the first conductive sub-layer 74 is protected by polishing member 64, the cathode regions 76 may be cleaned, such as by an acid etch or other process, between ECMP processes without damage to the first conductive sub-layer 74.

In an exemplary embodiment of the invention, conductive polishing assembly 60 further comprises one or more third holes 88 through which a conductive contact 84 may extend. While FIG. 3 illustrates the use of one conductive contact 84, it will be appreciated that any suitable number of conductive contacts may be used. Preferably, conductive polishing assembly 60 comprises about 3 to 100 conductive contacts 84. Because terminal effects are caused by voltage losses that occur because current is carried from the conductive contacts to substantially all portions of the wafer through the residual metallic film on the wafer, the greater the number of conductive contacts 84 used in conductive polishing assembly 60, the greater the reduction of such terminal effects. Conductive contact 84 is disposed within third hole 88 such that, when a wafer is pressed against polishing surface 80 of polishing member 64 with a predetermined force, a contact surface 102 of conductive contact 84 is substantially coplanar with surface 80 of polishing member 64.

Figure 5:
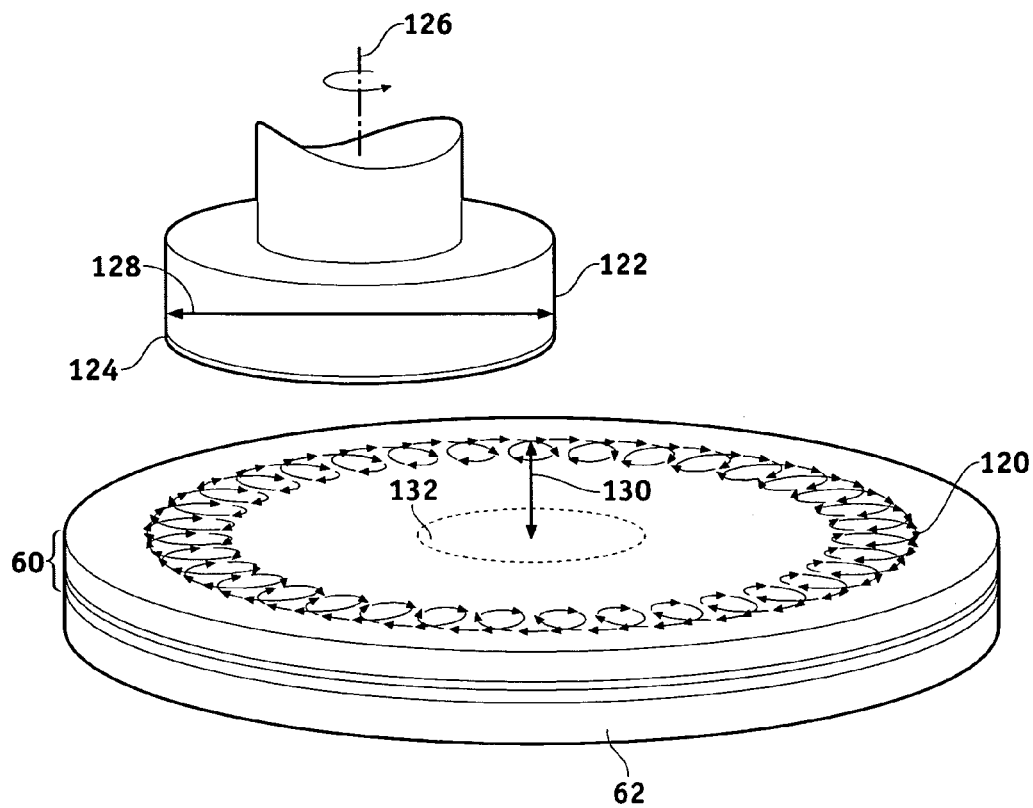
FIG. 5 is a schematic illustration of an ECMP system with a rotating wafer carrier and a conductive polishing apparatus configured to move orbitally, in accordance with an exemplary embodiment of the present invention.

The conductive contacts 84 may be distributed throughout conductive polishing assembly 60 in any suitable manner, such as randomly. Preferably, the conductive contacts are oriented so that they remain in continuous contact with a wafer when the wafer is urged against the conductive polishing assembly 60 during an ECMP process and motion is imparted between the wafer and the conductive polishing assembly 60. Referring to FIG. 5, in a preferred embodiment of the invention, the conductive polishing assembly 60 is moved orbitally, as indicated by arrows 120, while a wafer 124 carried by a wafer carrier 122 is rotated about its axis 126. ECMP systems with orbitally moving platens and polishing surfaces are known in the art. The wafer has a diameter "D", indicated by reference number 128, and conductive polishing apparatus 60 orbits about a diameter "d", indicated by reference number 130. In this regard, a region 132 of conductive polishing assembly 60 having a diameter "D-d" is in continuous contact with wafer 124 during the polishing of the wafer. Accordingly, the conductive contacts 84 may be disposed within region 132 to facilitate continuous contact of the conductive contacts 84 with the wafer, thus minimizing wear to the conductive contacts and reducing the risk of damage to wafer 124.

Figure 6:
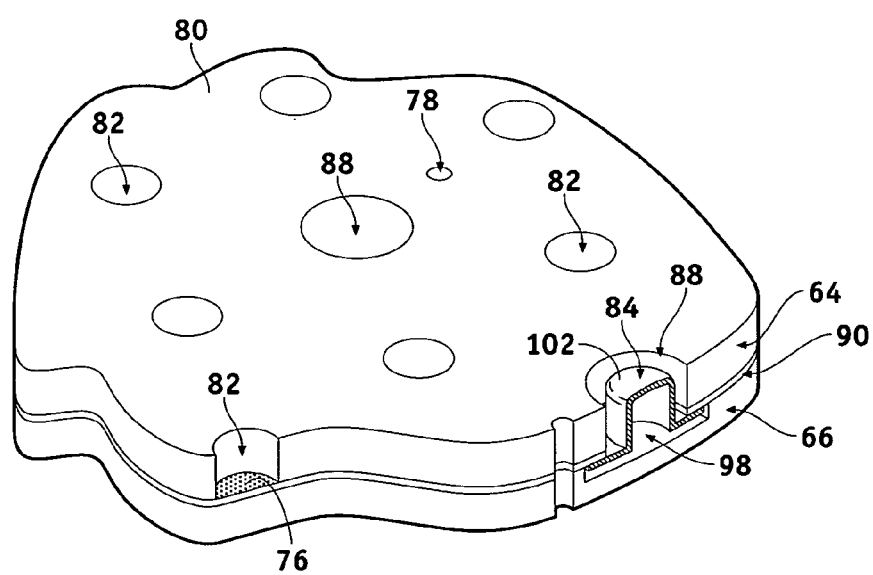
FIG. 6 is a schematic illustration of a conductive polishing apparatus in accordance with another exemplary embodiment of the present invention.

In an exemplary embodiment of the invention, conductive contacts 84 may comprise any suitable anodic contacts that are insulated from conductive member 68 and, for example, may comprise the various embodiments of the conductive contacts described in the commonly owned and concurrently filed patent application entitled "Conductive Contacts and Methods for Fabricating Conductive Contacts for Electrochemical Planarization of a Work Piece," by Drewery et al. In one embodiment of the invention, as illustrated in FIG. 3, the conductive contacts 84 may extend through orifices 86 of platen 62 that are coaxial with third holes 88 for electrical connection to an external circuit (not shown). In another, preferred, embodiment of the invention, as illustrated in FIGS. 6-8, the conductive contacts 84 may be in electrical contact with a conductive member 90 that is electrically coupled to an external circuit (not shown). Conductive member 90 is similar to conductive member 68 of FIGS. 3 and 4 as it may comprise a thin, flexible non-conductive layer 70 having a first (or front) face 92 upon which is disposed a conductive layer 72 that in turn may comprise a first conductive surface 74 and a cathode region(s) 76. A second (or back) face 94 of non-conductive layer 70 may comprise one or more conductors 96 that electrically couple conductive contact 84 to an external circuit (not shown). In an exemplary embodiment of the invention, each of the conductive contacts 84 may be seated within a recess 98 of backing member 66. The recess is coaxial with one of the third holes 88 of conductive member 90 and polishing member 64. Recess 98 may have a depth suitable to allow the conductive contact 84 to make electrical contact with the conductors 96 on the second face 94 of non-conductive layer 70. While FIGS. 6-8 illustrate conductive contact 84 electrically connected to conductors 96 on the second face 94 of non-conductive layer 70, it will be appreciated that the first face 92 of non-conductive layer 70 may be configured with conductors 96, which may be isolated from conductive layer 72, so that conductive contacts 84 may be mounted to first face 92. Conductive contact 84 has a height such that, when a wafer is pressed against polishing surface 80 of polishing member 64 with a predetermined force, contact surface 102 of conductive contact 84 is substantially coplanar with surface 80 of polishing member 64. With the conductive contacts 84 electrically coupled to an external circuit via conductive member 90, a CMP system can be converted to an ECMP systems by replacing the CMP polishing pad disposed on a platen with the conductive polishing assembly of the present invention.

Referring to FIG. 9, in another embodiment of the present invention, the conductive member 90 may be configured so that the third holes 88, and hence conductive contacts 84, are oriented in two or more zones that are electrically isolated from each other and are connected to different current supplies. In FIG. 9, two zones, first zone 150 and second zone 152, are electrically isolated from each other and are electrically connected via a first conductor 154 and a second conductor 156, respectively, to a first and a second external circuit (not shown), respectively. By supplying different electrical currents to different conductive contacts 84 electrically coupled to the conductive member, the metal removal rates can be "tuned" to enhance uniform removal of metal from the wafer. Changes to the configuration of these zones for purposes of process improvement can be made by replacing the conductive polishing assembly 60 with a different conductive polishing assembly having a conductive member with a different zone layout. In addition, as illustrated in FIG. 10, because conductive member 68 (or conductive member 90) is effectively a flexible circuit board, active components and connectors 170 may be electrically connected thereto, preferably outside the regions in contact with polishing member 64 and backing member 66, to control the current flow to each zone. For example, the conductors of conductive member 90 may connect electronic switches, voltage regulators, current regulators, sensing circuits, controllers, and the like to external circuits that control the voltage and current of the various zones. Further, signal conditioning circuitry could be electrically connected to conductive member 90 to facilitate accurate and reliable control of the overall ECMP system.

Referring again to FIG. 3, in another exemplary embodiment of the present invention, conductive polishing assembly 60 also may utilize other electric contacts 180 that are each connected to an external circuit so that other functions may be performed during the ECMP process. For example, certain of the electric contacts 180 may be voltage sensors configured to measure the voltage drop across a region of the wafer or may be configured to measure the sheet resistance of the metal remaining on the wafer and, thus, its thickness. Accordingly, end-point detection may be carried out without the use of sensors such as optical or eddy current detectors. Electric contacts 180 may be electrically coupled to the conductive member or may pass through fourth holes 182 of conductive polishing assembly 60.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A conductive planarization assembly for use in electrochemical mechanical planarization, the conductive planarization assembly comprising:
   a first insulating member;
   a second insulating member overlying said first insulating member and having a plurality of first holes; and
   a conductive member interposed between said first insulating member and said second insulating member and electrically coupled to an external circuit, wherein said conductive member comprises a non-conductive layer, a first conductive sub-layer disposed on said non-conductive layer and formed of a first conductive material, and a plurality of electrode regions disposed on said first conductive sub-layer and formed of a second conductive material having a composition different from said first conductive material, said plurality of electrode regions exposed by said plurality of first holes,
   wherein said second insulating member and said conductive member each comprise a second hole and wherein said second holes are coaxial and are configured to receive a conductive contact and permit the conductive contact to extend through said second holes and make physical contact with a surface to be planarized.

2. The conductive planarization assembly of claim 1, wherein said plurality of electrode regions comprise a noble metal.

3. The conductive planarization assembly of claim 1, wherein said plurality of electrode regions are contiguous.

4. The conductive planarization assembly of claim 1, wherein said first conductive sub-layer comprises copper and said plurality of electrode regions comprise a noble metal.

5. The conductive planarization assembly of claim 1, wherein said conductive planarization assembly further comprises a first conductive contact that is electrically coupled to said conductive member and that extends through said second holes.

6. The conductive planarization assembly of claim 5, wherein said conductive member comprises a first surface and a second surface, wherein said plurality of electrode regions are disposed on said first surface and a conductor is disposed on said second surface, and wherein said first conductive contact is electrically coupled to said conductor.

7. The conductive planarization assembly of claim 5 further comprising a second conductive contact that is electrically coupled to said conductive member and extends through said second insulating member, wherein said first conductive contact is electrically coupled to a first external circuit via a first conductor disposed on said conductive member, and wherein said second conductive contact is electrically coupled to a second external circuit via a second conductor disposed on said conductive member, and wherein said first conductive contact and said first conductor are electrically isolated from said second conductive contact and said second conductor.

8. The conductive planarization assembly of claim 1, wherein said first insulating member has a first flexible property and said second insulating member has a second flexible property, and wherein said first and second flexible properties are the same.

9. The conductive planarization apparatus of claim 1, wherein said conductive member is less flexible than said first insulating member.

10. The conductive planarization apparatus of claim 1, further comprising a sensor that is electrically coupled to said conductive member and that is exposed by a second hole in said second insulating member.

11. A polishing assembly for an ECMP system, the polishing assembly comprising:
    a backing member having a first surface with a plurality of recesses formed therein;
    a plurality of conductive contacts, each of which is seated in one of said plurality of recesses and is configured to make physical contact with a surface to be planarized;
    a conductive member disposed overlying said backing member, wherein said conductive member comprises a plurality of counterelectrodes and a plurality of first holes through each of which extends a conductive contact and wherein said conductive member is electrically coupled to each of said plurality of conductive contacts; and
    a polishing member disposed overlying said conductive member and having a plurality of first openings and a plurality of second openings, wherein each of said plurality of first openings exposes one of said plurality of counterelectrodes and wherein each of said plurality of conductive contacts extends through one of said plurality of second openings, wherein said plurality of first openings are not the said plurality of second openings.

12. The polishing assembly of claim 11, wherein said plurality of counterelectrodes comprises a continuous layer of noble metal.

13. The polishing assembly of claim 11, wherein said conductive member comprises a non-conductive layer having a first surface and a second surface and a first conductive sub-layer overlying said first surface and underlying said plurality of counterelectrodes.

14. The polishing assembly of claim 13, wherein said first conductive sub-layer comprises a network of open holes.

15. The polishing assembly of claim 13, wherein said first conductive sub-layer comprises copper and said plurality of counterelectrodes comprises platinum.

16. The polishing assembly of claim 11, wherein said conductive member comprises a first surface and a second surface and said plurality of counterelectrodes are disposed on said first surface and wherein said conductive member further comprises at least one conductor disposed on said second surface and electrically coupled to said plurality of conductive contacts.

17. The polishing assembly of claim 11, wherein each of said plurality of conductive contacts has a height and a conductive surface such that, when a wafer is urged against a polishing surface of said polishing member, said conductive surface is substantially coplanar with said polishing surface of said polishing member.

18. An electrochemical mechanical planarization system comprising:
    a wafer carrier configured to hold a wafer and to rotate the wafer about an axis of the wafer;
    a platen in confrontation with said wafer carrier and configured to move orbitally;
    a backing member disposed on said platen;
    a conductive member disposed on said backing member, said conductive member comprising:
    a first surface and a second surface;

a plurality of cathode regions disposed on said first surface, wherein said plurality of cathode regions is electrically coupled to a first external circuit;

a first plurality of conductors disposed on said first or second surface and electrically coupled to a second external circuit; and a first plurality of conductive contacts that are electrically coupled to said first plurality of conductors, wherein each of said first plurality of conductive contacts has an extending member with a conductive surface that is configured to make physical contact with a surface to be planarized; and a polishing member disposed on said first surface of said conductive member and having a polishing surface, a first set of holes, and a second set of holes, wherein each of said first set of holes exposes one of said plurality of cathode regions, wherein said extending members of said first plurality of conductive contacts extend through said second set of holes, and wherein said first set of holes and the said second set of holes are mutually exclusive;

wherein, when said wafer carrier urges said wafer against said polishing surface of said polishing member, said conductive surfaces of said first plurality of conductive contacts are substantially coplanar with said polishing surface.

19. The electrochemical mechanical planarization system of claim 18, wherein said first plurality of conductive contacts are oriented relative to said polishing member so that, when said wafer carrier urges said wafer against said polishing surface and motion is imparted to said platen, said first plurality of conductive contacts remains in continuous contact with said wafer.

20. The electrochemical mechanical planarization system of claim 18, wherein said conductive member further comprises a second plurality of conductors disposed on said first or second surface of said conducting member and electrically coupled to a third external circuit and a second plurality of conductive contacts that are electrically coupled to said second plurality of conductors, and wherein said first plurality of conductive contacts is electrically isolated from said second plurality of conductive contacts.

21. The electrochemical mechanical planarization system of claim 18, wherein said conductive member further comprises active components that are disposed on a region of said conductive member that is not in contact with said backing member or said polishing member.

* * * * *